March 4, 1969  W. MAIER  3,430,799
ELECTRICAL JUNCTION BOXES
Filed Aug. 31, 1966
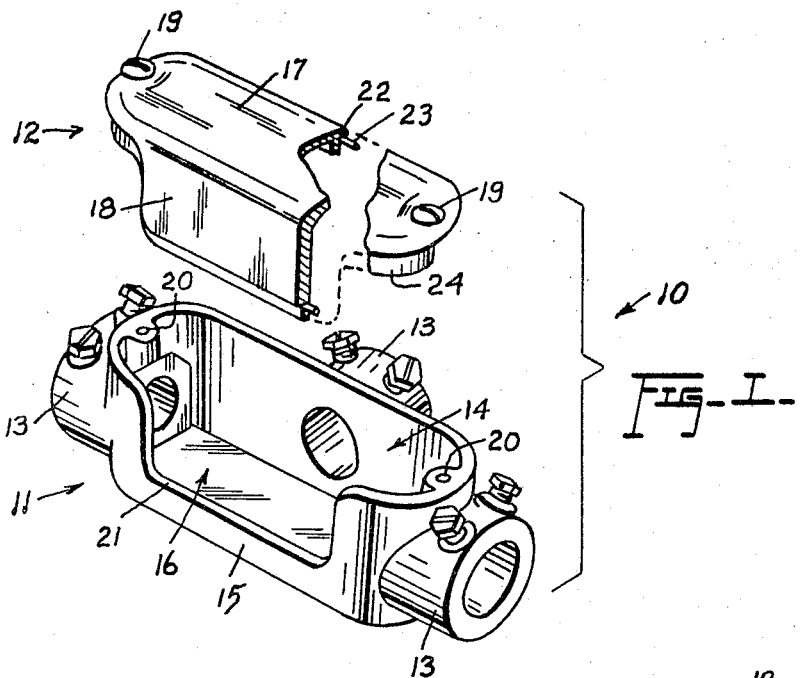
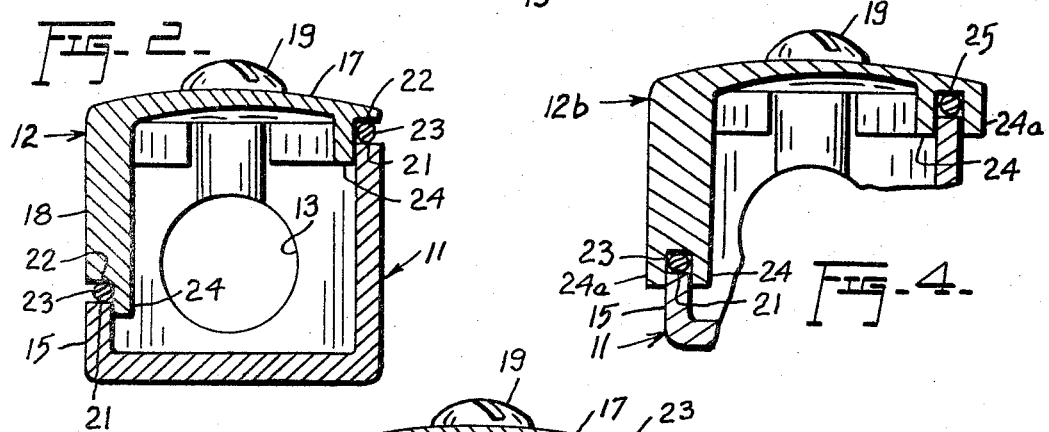
INVENTOR
William Maier
BY Munson H. Lane
ATTORNEY > United States Patent Office 3,430,799
Patented Mar. 4, 1969

3,430,799
ELECTRICAL JUNCTION BOXES
William Maier, 125 Lawlor Terrace,
Stratford, Conn. 06497
Continuation-in-part of application Ser. No. 547,226,
May 3, 1966, Patent No. 3,355,048. This application Aug. 31, 1966, Ser. No. 576,345
U.S. Cl. 220—3.94                1 Claim
Int. Cl. H02g *3/08;* B65d *43/02*

ABSTRACT OF THE DISCLOSURE

Two complemental, separably assembled box sections sealed by a continuous gasket which is interposed between their opposing edges. One of the box sections is provided with either an inside, an outside, or both inside and outside flanges to retain the gasket and overlap the other box section.

---

This application is a continuation-in-part of my copending application Ser. No. 547,226, filed May 3, 1966, now Patent No. 3,355,048, dated Nov. 28, 1967.

The aforementioned patent discloses an electrical junction box consisting of two complemental box sections separably held together in assembled relation, the box sections having mutually opposed edges along their line of separation, and a gasket being interposed between the opposing edges of the box sections. Also, flange means are provided integrally on one of the box sections to span the gasket and overlap the other box section, thereby effectively sealing the box against ingress of foreign matter.

The present invention concerns itself particularly with the gasket and flange arrangement, the principal object of the invention being to provide a gasket and flange arrangement which may be embodied in electrical junction boxes in general, and especially in a box of the type disclosed in my earlier United States Patent No. 3,029,965, dated Apr. 17, 1962. Thus, the present invention represents an improvement in the box disclosed in that patent.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a group perspective view of an electrical junction box, with the cover separated from the box body and a portion of the cover broken away;

FIGURE 2 is an enlarged, vertical cross-sectional view showing the box body and cover assembled;

FIGURE 3 is a fragmentary cross-sectional view, similar to that in FIG. 2 but illustrating a modified embodiment; and FIGURE 4 is a fragmentary cross-sectional view showing another modified embodiment.

Referring now to the accompanying drawings in detail, the electrical junction box is designated generally by the reference numeral 10 and comprises two complemental box sections, namely, a box body 11 and a cover 12.

The box body 11, which may be elongated as shown, is provided with a plurality of conventional sockets 13 for connecting electrical conduits (not shown) to the box. The box body has an open top 14 and includes a side wall 15 formed with a lateral opening 16 which communicates with the open top, so as to permit convenient access to the interior of the box body when electrical conductors are to be joined together, separated, and the like.

The cover 12 includes a top plate 17 which overlies and closes the open top 14 when the cover is applied to the box body. The cover also includes a side plate 18 formed integrally at one side of the cover, the side plate 18 closing the lateral opening 16 in the side wall 15. The end portions of the top plate 17 are apertured to receive suitable screws 19, the latter being receivable in bores 20 provided in the box body 11, whereby the box body and cover are separably held in assembled relation.

The box body 11 has a continuous edge 21 defining the open top 14 and the lateral opening 16, this edge being opposed to a similar continuous edge 22 extending around the top plate 17 and side plate 18 of the cover 12. It may be noted at this point that while the central portion of the cover top plate 17 which overlies the open top 14 may be crowned as shown, the end portions of the top plate equipped with the screws 19 are flattened and the continuous opposing edges 21, 22 are parallel with each other along their entire length.

A continuous sealing gasket 23 is interposed between the opposing edges 21, 22 of the body 11 and cover 12 respectively, the gasket being formed from suitable elastomeric material such as natural or synthetic rubber, plastic, or the like, and being subject to compression to a greater or lesser extent, when the screws 19 are tightened. As will be understood, the gasket has an endless form to extend continuously along the line of separation between the box body and the cover, and if desired, the gasket may have a circular or oval cross-section, although not necessarily so, since a gasket of a rectangular cross-section may also be employed.

In addition to the gasket, the sealing means for the box comprise a continuous flange 24 which is formed integrally with the cover 12 alongside of the edge 22. As shown in FIG. 2, when the cover is applied to the box body, the flange spans the gasket 23 and overlaps the edge portion 21 of the box body, thus coacting with the gasket in preventing ingress of foreign matter into the box. The flange 24 also has an additional function in that it assists in holding the gasket in place on the cover, during application of the cover to the box body, so that it is not necessary to hold the gasket in position by hand.

It will be noted that in the embodiment of FIGS. 1 and 2 the flange 24 is spaced inwardly from the outside of the cover and when the cover is applied to the box body, the flange overlaps the box body on the inside, thus leaving the gasket exposed.

However, a modified arrangement is illustrated in FIG. 3 wherein the flange 24a is provided along the outside of the cover 12a and overlaps the box body 11 on the outside, so that the gasket is concealed by the flange.

Moreover, in another modified arrangement shown in FIG. 4, the cover 12b is provided with both inside and outside flanges 24, 24a, respectively, which overlap the box body on the inside as well as on the outside. These two flanges, being in a mutually spaced parallel relation, define a continuous groove 25 between them. As will be apparent, the groove 25 not only provides a seat for the gasket, but also receives the edge portion 21 of the box body therein.

What is claimed as new is:

1. In an electrical junction box, the combination of a box body having an open top and including a side wall provided with a lateral opening communicating with said open top, a complemental cover separably assembled to said box body, said cover including a top plate closing the open top of the body and an integral side plate closing said lateral opening, a pair of spaced parallel flanges extending continuously around the marginal edges of the top plate and side plate of said cover, said flanges defining therebetween a continuous groove of the same width as edges of the box body surrounding the open top and lateral opening thereof, said open top and lateral opening surrounding edges of the box body being received in said groove and overlapped internally and externally by said flanges of the cover, and a continuous sealing gasket seated in said groove in engagement with the open top and lateral opening surrounding edges of the box body.

References Cited

UNITED STATES PATENTS

| | | | |
|---|---|---|---|
| 551,511 | 12/1895 | Salenius. | |
| 883,549 | 3/1908 | Lakin | 220—3.8 |
| 1,809,079 | 6/1931 | Smith | 220—4 X |
| 1,869,646 | 8/1932 | Anderson | 220—3.8 X |
| 2,454,962 | 11/1948 | Brown | 220—46 X |
| 2,512,105 | 6/1950 | Kooij et al. | 220—4 X |
| 2,586,715 | 2/1952 | Richeson et al. | 220—46 X |
| 2,720,332 | 10/1955 | Holt | 220—4 |
| 3,029,965 | 4/1962 | Maier | 220—3.8 |
| 3,033,913 | 5/1962 | Dietze | 220—4 X |
| 3,136,398 | 6/1964 | Platt | 220—4 X |
| 3,288,910 | 11/1966 | Zerwes | 220—46 X |

JOSEPH R. LECLAIR, *Primary Examiner.*

JAMES R. GARRETT, *Assistant Examiner.*

U.S. Cl. X.R.

220—46